United States Patent Office 3,344,191
Patented Sept. 26, 1967

3,344,191
PROCESS FOR ISOMERIZING UNSATURATED ALCOHOLS
Sterling F. Chappell, Lake Charles, La., and Claud E. Sibert, Nederland, Tex., assignors, by mesne assignments, to Columbian Carbon Company, a corporation of Delaware
No Drawing. Filed Dec. 3, 1963, Ser. No. 327,826
10 Claims. (Cl. 260—586)

This invention relates to a process for the isomerization of unsaturated alcohols and more particularly for the isomerization of unsaturated alcohols at elevated temperature in the presence of iron carbonyl, preferably under carbon monoxide pressure.

The isomerization of allylic alcohols in the presence of copper, nickel, or palladium is known. The use of cobalt carbonyl under sufficient carbon monoxide pressure to prevent decomposition of cobalt carbonyl, e.g., well over 400 p.s.i.g. at 150° C., has also been described for isomerizing certain unsaturated alcohols.

It has now been found that an olefinically unsaturated alcohol can be isomerized by contact with iron carbonyl at elevated temperature and particularly under mild carbon monoxide pressure. The process of this invention can produce high yields of isomerized products such as ketones or aldehydes.

A significant feature of this invention is that although isomerization of unsaturated alcohol occurs under conditions in which the iron carbonyl is stabilized under a relatively high carbon monoxide pressure, e.g. 500 p.s.i.g. at 150° C., reaction occurs at a much faster rate when the carbon monoxide pressure is reduced or removed to allow some of the iron carbonyl catalyst to decompose. The isomerization proceeds by dissociation of the iron carbonyl catalyst and by the formation of some catalytic species which is stabilized by carbon monoxide pressure.

Since the process of this invention is conducted without the use of pressure or under relatively mild pressure, it is not necessary to use high pressure reactors which are employed in some of the prior art. During isomerization the iron carbonyl can decompose to elemental iron and carbon monoxide. The elemental iron residue can be easily removed from the reaction mixture by magnetic separation or other convenient means such as filtration or by distilling the product away from the solid catalyst residue.

During isomerization of the unsaturated alcohol, the ethylenic double bond moves stepwise from carbon to carbon atom and eventually displaces the hydrogen of the hydroxyl group to convert the carbon atom and its attached oxygen to the carbonyl group, whereas the displaced hydrogen is substituted for ethylenic unsaturation. Thus an unsaturated alcohol having the ethylenic (or olefinic) double bond in a different position from that of the starting unsaturated alcohol can also be produced by the process of this invention.

Suitable unsaturated alcohols for the process of this invention are those having at least three carbon atoms such as those having from three to about twenty-two carbon atoms and preferably those having about four to about twelve carbon atoms. The unsaturated alcohol can be aliphatic, alicyclic, or aromatic. In the case of aromatic unsaturated alcohols, an aliphatic chain of at least three carbon atoms is required to provide for olefinic unsaturation and the hydroxyl group.

This process is applicable to unsaturated alcohols regardless of whether such alcohols have been produced by synthesis or any of the well-known processes from natural products or occur naturally. Oleyl alcohol as well as other unsaturated alcohols occurring in the form of esters and which can be readily recovered from the esters can be employed in this invention. Also, the unsaturated alcohols can be obtained from the corresponding unsaturated carboxylic acids, e.g., fatty acids, by reduction of the carboxylic group or groups. The term "unsaturated alcohol" as used herein refers to a hydrocarbon derivative having olefinic or ethylenic unsaturation in which one or more hydroxyl groups have replaced a corresponding number of hydrogen atoms.

The unsaturated alcohols can be those of straight or branched chain aliphatic or cycloaliphatic groups. The unsaturated alcohols can have one, two or more sites of ethylenic unsaturation, e.g., monoolefinic, diolefinic, etc. Also, they can have one or more hydroxyl groups, e.g., the alcohol can be monohydric, dihydric, trihydric or polyhydric. Preferably the unsaturated alcohol is monohydric and has monoolefinic unsaturation.

In those instances when the hydroxyl is converted into a carbonyl, such as the preparation of the corresponding ketones or aldehydes, the carbon atom on which the hydroxyl is attached must have one or two hydrogen atoms, i.e., primary or secondary alcohol, to permit formation of the carbonyl group. The hydroxyl group can be on a carbon atom adjacent to a carbon atom having olefinic unsaturation or the hydroxyl containing carbon atom and that having olefinic unsaturation can be separated by a chain of carbon atoms such as that of from one to ten or more carbon atoms. Generally in the preparation of ketones or aldehydes the hydroxyl group and the olefinic unsaturation can be separated by an aliphatic segment of the alcohol having from 2 to about 12 carbon atoms. This aliphatic segment can be a part of a straight, branched, or alicyclic group. Preferably the hydroxyl and olefinic unsaturation are separated by 2 to 5 carbon atoms such as in allylic alcohols wherein the hydroxyl and olefinic unsaturation are separated by 2 carbon atoms. The olefinic unsaturation can be terminal or it can be within the aliphatic chain on carbon atoms other than a terminal carbon atom.

In a preferred embodiment of the invention, the unsaturated alcohol can be represented by the formula:

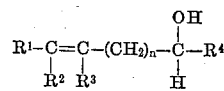

(Formula I)

wherein each of $R^1$, $R^2$, $R^3$ and $R^4$ can be hydrogen, aryl, alkyl, and combinations of alkyl and aryl, e.g., alkaryl, phenalkyl and the like; $n$ is an integer from 0 to about 10 and preferably 0 to 3; any two of the $R^1$, $R^2$, $R^3$ or $R^4$ groups can be joined to form a ring; and wherein the total number of carbon atoms in the unsaturated alcohol is from 3 to about 22 and preferably from 4 to about 12. When any two of the R groups are joined to form a cyclic group, the joined groups can be alkylene and the compounds can have formulae such as:

(a) 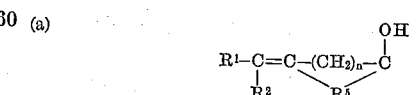

(b) 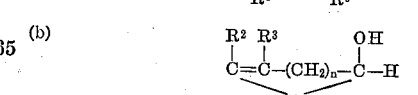

(c) 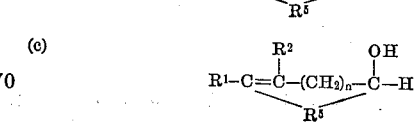

(d) 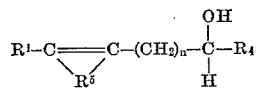

wherein each of $R^1$, $R^2$, $R^3$, and $R^4$ represent the same groups as those mentioned herein above and $R^5$ is alkylene (e.g. $-CH_2-CH_2-$) having from 2 to about 10 carbon atoms. The aryl groups can be mono- or polycyclic, e.g., phenyl or naphthyl.

A preferred formula limited to alicyclic unsaturated alcohols is

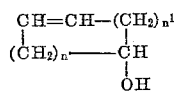

wherein $n$ is an integer from 1 to 12, $n'$ is an integer from 0 to 3, and the total of $n$ and $n'$ is from 2 to 13 and preferably from 3 to 9.

Illustrative of primary or secondary aliphatic unsaturated alcohols there can be mentioned: 4-methyl-3-penten-1-ol; 4-penten-2-ol; 1-penten-3-ol; 4-ethyl-1-hexen-3-ol; 1-buten-3-ol; 1-hexen-3-ol; 4-methyl-1-penten-3-ol; 2,2-dimethyl-6-hepten-3-ol; 3-ethyl-5-hexen-2-ol; 4-nonen-1-ol; 4-hexen-1-ol; 4-octen-1-ol; 2-buten-1-ol; 1-buten-4-ol; 9-octadecen-1-ol; 4-penten-1-ol; 5-decen-1-ol; 6-dodecen-2-ol; and the like. Illustrative of aromatic unsaturated alcohols there can be mentioned: 1-phenyl-2-propen-1-ol; 1-phenyl-3-buten-1-ol; 1-phenyl-4-hexen-2-ol; and the like. Illustrative of cycloaliphatic unsaturated alcohols there can be mentioned 2-cyclopenten-1-ol; 2-cyclohexen-1-ol; 3-cyclohexen-1-ol; 2-cycloocten-1-ol; 3-cycloocten-1-ol; and the like.

Since the isomerization proceeds by the stepwise movement of the double bond of the unsaturated alcohol, the reaction product can contain the corresponding carbonyl compound with one less cite of olefinic unsaturation, a corresponding unsaturated alcohol with the olefinic bond in a different position on the aliphatic or cycloaliphatic chain, or both of these isomers. As the reaction proceeds, more of the corresponding carbonyl compound is prepared, and the yield of carbonyl compound can be well above 70% or 80%, based on the quantity of the original unsaturated alcohol reactant. In the process of this invention the reaction time is not critical and can vary over a wide range such as that of a few minutes, e.g., five minutes to more than a day or two but preferably from about fifteen minutes to about four hours. The reaction product can be recovered from the reaction mixture by conventional techniques such as filtration, fractional distillation, chromatographic adsorption, and combinations of such techniques.

As mentioned hereinbefore, carbon monoxide is not necessary in the reaction, although preferably the reaction is conducted under a carbon monoxide atmosphere of from about 5 p.s.i.g. to about 200 p.s.i.g. and particularly from about 10 p.s.i.g. to about 60 p.s.i.g. The carbon monoxide can contain minor quantities of inert diluents such as no more than about 10% or 15% of inert diluents, e.g., carbon dioxide, nitrogen, etc.

The conversion to isomerized products and particularly ketones per time unit is greatly improved if instead of employing carbon monoxide pressure sufficiently high to stabilize the iron carbonyl, e.g., 500 p.s.i.g. at 160 C., the carbon monoxide pressure is less than that required to stabilize the iron carbonyl at the temperature employed and thus permits decomposition of the iron carbonyl catalyst. At the temperatures employed in this invention, the carbon monoxide pressure should be no greater than about 200 p.s.i.g. The use of mild carbon monoxide pressure produces a substantial increase in the conversion rate of isomerized products based on catalyst consumed compared to the absence of pressure. When the pressure is sufficiently high to prevent decomposition of the iron carbonyl, the reaction proceeds at a very slow rate.

The iron carbonyl catalyst can be iron pentacarbonyl or any other iron carbonyl such as those which can be represented by the formula $Fe_x(CO)_y$ wherein $x$ and $y$ are the coordination numbers of the iron carbonyl. Illustrative of suitable carbonyls there can be mentioned those of the formula: $Fe(CO)_5$; $Fe_2(CO)_9$; $Fe_3(CO)_{12}$; and the like. Iron pentacarbonyl is the preferred catalyst. The amount of catalyst employed in the reaction should be at least 0.1% based on the weight of unsaturated alcohol. However, quantities of 10% or more based on the weight of unsaturated alcohol can be employed. Preferably the quantity of iron carbonyl is from about 0.5% to 5% and particularly from 1% to 3% based on the weight of unsaturated alcohol in the reaction mixture.

The reaction temperature can vary from about 90° C. to about 250° C. In the case of alicyclic unsaturated alcohols the temperature should be at least about 130° C. Preferably the reaction temperature is from about 160° C. to about 200° C.

The process in accordance with the present invention differs from the well-known oxo process and its variations, and in which unsaturated hydrocarbons are heated in the presence of cobalt catalysts and carbon monoxide, since substantial quantities of a compound or substance having shiftable hydrogen atoms in the molecule, such as hydrogen, water, carboxylic acids and amides is absent from the reaction mixture. Also, in the present process, substantial quantities of any other material which would react under the chosen conditions with any other compounds present in the reaction mixture or which would serve as catalysts, e.g. halides or metals of the iron group, for other types of reactions are excluded. As mentioned hereinbefore, the isomerization of unsaturated alcohols in accordance with this invention is based on internal rearrangement of the unsaturated alcohol.

The following examples are illustrative of this invention. It is understood, however, that the present invention is not limited to these examples.

Example 1

To 10.0 g. of 2-cycloocten-1-ol in a round bottom flask was added 0.5 ml. (about 0.7 g.) of $Fe(CO)_5$. The 2-cycloocten-1-ol was heated to 140° C. for one hour, then allowed to cool overnight. It was reheated the next day for an additional three hours at 140° C. The cooled product was examined by gas phase chromatography and was found to contain 89.8% cyclooctanone.

Example 2

A mixture of 70 g. cinnamyl alcohol and 5 ml. $Fe(CO)_5$ was heated at 130–160° C. for six hours. The product was distilled and the fraction boiling 64–67° C. at 1 mm. of mercury pressure was found to be beta-phenylpropionaldehyde. The derivatives prepared, the semi-carbazone and the 2,4-dinitrophenylhydrazone, melted at the temperatures reported in the literature. Conversion for this reaction was 100% based on the cinnamyl alcohol.

Example 3

A series of experiments were run on the isomerization of 2-cycloocten-1-ol to cyclooctanone with $Fe(CO)_5$ as the catalyst. Reaction conditions and analyses at timed intervals of reactant and major products are given in Table 1 wherein: the weight percent (wgt. %) of catalyst is based on the quantity of 2-cycloocten-1-ol in the reaction mixture; 2-COE-1-ol designates 2-cycloocten-1-ol; CONE designates cyclooctanone and 3-COE-1-ol designates 3-cycloocten-1-ol. The experiments were run in the following manner:

A sample of 2-cycloocten-1-ol (150 g.) was charged to a 300 ml. stirred stainless steel autoclave. Iron carbonyl (1.0 ml., 1.5 g.) was introduced from a calibrated syringe and the autoclave was then sealed, evacuated of air and pressured with carbon monoxide to 500 p.s.i.g.

The mixture upon being brought to reaction temperature was sampled and the pressure was released to that used for the particular experiment. The start of the reaction was assumed to be coincident with the lowering of the pressure. A carbon monoxide pressure of 500 p.s.i.g. was assumed to be high enough to inhibit reaction during the heat-up period. Samples were cooled and protected from light. Analysis for the organic material was by gas phase chromatography.

*Example 4*

A mixture of 150 g. 2-cycloocten-1-ol and 1.0 ml. (1.5 g.) $Fe(CO)_5$ was charged to a 300 ml. stirred autoclave. The autoclave was sealed, evacuated of air and heated with stirring to 200° C. The pressure was allowed to increase to a maximum of 110 p.s.i.g. and was then bled off in 5–10 p.s.i.g. increments to a final pressure of 20 p.s.i.g. After a total reaction time of 290 minutes, the mixture was cooled and removed from the autoclave. There was obtained a product consisting of 89.2% cyclooctanone and 10.6% of 3-cycloocten-1-ol.

*Example 5*

A mixture of 150 g. of 2-cycloocten-1-ol and 1.0 ml. (1.5 g.) $Fe(CO)_5$ was charged to a 300 ml. autoclave as in Example 4. The autoclave was pressured to 20 p.s.i.g. with carbon monoxide; a pressure relief valve was set to vent gases at 20 p.s.i.g. After 180 minutes at 200° C. (including 22 minutes heatup time) there was obtained a product containing 85.1% cyclooctanone and 13.9% 3-cycloocten-1-ol.

TABLE 1
$Fe(CO)_5$ catalyzed isomerization of 2-cycloocten-1-ol

| Run | Catalyst Conc., Weight percent | CO | | | Analysis | | |
|---|---|---|---|---|---|---|---|
| | | Temp., °C. | Press., p.s.i.g. | Time, min. | 2-COE-1-ol | CONE | 3-COE-1-ol |
| 2-13A | 1 | 140 | 10 | 0 | 97.4 | 0.5 | 0.5 |
| B | | | | 5 | 97.0 | 0.7 | 0.4 |
| C | | | | 10 | 96.4 | 1.4 | 0.6 |
| D | | | | 20 | 93.4 | 4.5 | 0.7 |
| E | | | | 40 | 93.8 | 3.6 | 0.9 |
| F | | | | 80 | 87.9 | 8.5 | 1.9 |
| G | | | | 160 | 78.8 | 16.0 | 3.6 |
| H | | | | 265 | 65.5 | 27.3 | 5.3 |
| 2-17A | 1 | 190 | 10–20 | 0 | 96.4 | 1.1 | 0.5 |
| B | | | | 5 | 5.0 | 79.2 | 14.1 |
| C | | | | 16 | 2.0 | 82.3 | 13.8 |
| D | | | | 25 | 0.7 | 84.9 | 12.7 |
| E | | | | 40 | 0.4 | 85.2 | 12.4 |
| F | | | | 64 | 0.2 | 85.5 | 12.1 |
| 2-18A | 1 | 190 | 300 | 0 | 95.0 | 1.5 | 1.3 |
| B | | | | 5 | 92.5 | 3.0 | 1.5 |
| C | | | | 10 | 86.7 | 7.7 | 2.6 |
| D | | | | 20 | 82.8 | 10.6 | 3.5 |
| E | | | | 40 | 71.9 | 19.4 | 5.4 |
| F | | | | 70 | 50.4 | 36.9 | 9.1 |
| 2-27A | 1 | 190 | 200 | 0 | 97.4 | 0.7 | 0.2 |
| B | | | | 5 | 95.4 | 2.9 | 0.6 |
| C | | | | 10 | 91.8 | 5.5 | 1.0 |
| D | | | | 20 | 88.1 | 8.9 | 1.5 |
| E | | | | 40 | 77.7 | 17.4 | 3.2 |
| F | | | | 80 | 56.9 | 35.2 | 6.3 |
| G | | | | 160 | 30.2 | 57.8 | 9.7 |

*Example 6*

The procedure used for Example 5 was repeated using a maximum pressure of 16 p.s.i.g. and a temperature of 190° C. No pressure was applied to the system before heating to reaction temperature. A product was obtained which contained 78.4% cyclooctanone and 21.6% 3-cyclo-octen-1-ol.

The isomerization of unsaturated alcohols to the corresponding ketones or aldehydes can be illustrated by the following equation:

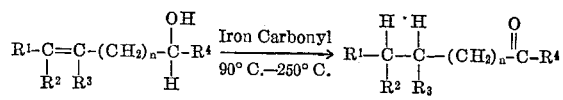

wherein each of $R^1$, $R^2$, $R^3$, and $R^4$ represent the same groups and can be jointed in the same manner as that of the hereinabove illustrated Formula I.

All percentage values given herein are on a weight basis unless otherwise indicated. The abbreviation p.s.i.g. refers to pounds per square inch guage. Preferably in the process of this invention, the iron carbonyl is intimately admixed with the unsaturated alcohol, e.g. the catalyst is dispersed or dissolved in the unsaturated alcohol.

What is claimed is:

1. A process for isomerizing an unsaturated alcohol which comprises contacting said alcohol at a temperature of about 90° C. to about 250° C. with an iron carbonyl selected from the group consisting of $Fe(CO)_5$, $Fe_2(CO)_9$ and $Fe_3(CO)_{12}$ at a pressure below the decomposition pressure of said iron carbonyl, said unsaturated alcohol consisting of hydrogen, oxygen and from 3 to about 22 carbon atoms, said oxygen being present only in hydroxyl groups, and said alcohol having a hydrogen bearing carbinol group separated from a hydrogen bearing carbon atom, that is attached to an ethylenic double bond, by a linear alkylene hydrocarbon chain of from 0 to about 10 carbon atoms.

2. The process of claim 1 wherein the isomerization is conducted under a carbon monoxide pressure of from about 5 p.s.i.g. to about 200 p.s.i.g.

3. The process of claim 2 wherein the temperature is at least about 130° C. and the carbon monoxide pressure is from about 10 p.s.i.g. to about 60 p.s.i.g.

4. The process of claim 2 wherein the iron carbonyl is iron pentacarbonyl.

5. The process for isomerizing an unsaturated alcohol which comprises contacting, at a temperature of from about 130° C. to about 250° C., an olefinically unsaturated cycloaliphatic compound of the formula:

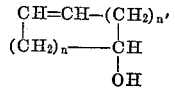

wherein $n$ is an integer from 1 to 12, $n'$ is an integer from 0 to 3, and the total of $n$ and $n'$ is from 2 to 13, with an iron carbonyl selected from the group consisting of $Fe(CO)_5$, $Fe_2(CO)_9$ and $Fe_3(CO)_{12}$ under a carbon monoxide pressure of from about 5 p.s.i.g. to about 200 p.s.i.g.

6. The process of claim 5 wherein the temperature is from 160° C. to 250° C., the carbon monoxide pressure is from about 10 p.s.i.g. to about 60 p.s.i.g., and the total of $n$ and $n'$ is from 3 to 5.

7. A process for isomerizing 2-cycloocten-1-ol to cyclooctanone which comprises contacting 2-cycloocten-1-ol with an iron carbonyl selected from the group consisting of $Fe(CO)_5$, $Fe_2(CO)_9$ and $Fe_3(CO)_{12}$ at a temperature of from about 130° C. to 250° C. under a carbon monoxide atmosphere having a pressure of from about 5 p.s.i.g. to about 200 p.s.i.g.

8. The process of claim 7 wherein the temperature is from 160° C. to 200° C., the quantity of iron carbonyl is from about 0.1 to 10%, based on the 2-cycloocten-1-ol, and the carbon monoxide atmosphere has a pressure of from about 10 p.s.i.g. to 60 p.s.i.g.

9. A process for isomerizing cinnamyl alcohol to beta-phenylpropylaldehyde which comprises contacting cinnamyl alcohol with an iron carbonyl selected from the group consisting of $Fe(CO)_5$, $Fe_2(CO)_9$ and $Fe_3(CO)_{12}$, the quantity of iron carbonyl being from about 0.5% to about 5% based on the weight of the alcohol, at a temperature of from about 90° C. to about 250° C. and under a pressure of less than about 200 p.s.i.g.

10. A process for isomerizing 1-penten-4-ol to 2-pentanone which comprises heating 1-penten-4-ol in contact with an iron carbonyl selected from the group consisting of $Fe(CO)_5$, $Fe_2(CO)_9$ and $Fe_3(CO)_{12}$ at a temperature of from about 90° C. to about 250° C. and under a pressure of less than about 200 p.s.i.g.

References Cited

UNITED STATES PATENTS 2,837,577   6/1958   Blaser et al. _____ 260—491 X

OTHER REFERENCES

Arnet et al.: "J. Am. Chem. Soc.," vol. 83, pp. 2954 to 5 (1961).

Eisenmann: "J. Org. Chem.," vol. 27, page 2706 (1962).

Wender et al.: "U.S. Bureau of Mines Bulletin," vol. 600, pp. 76–78 (1962).

LEON ZITVER, *Primary Examiner.*

BERNARD HELFIN, *Examiner.*

MATTHEW M. JACOB, *Assistant Examiner.*